(12) United States Patent  
Suzuki

(10) Patent No.: US 7,151,676 B2  
(45) Date of Patent: Dec. 19, 2006

(54) RECORDING MEDIA PROTECTING MECHANISM

(75) Inventor: Shinji Suzuki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 146 days.

(21) Appl. No.: 10/767,209

(22) Filed: Jan. 30, 2004

(65) Prior Publication Data

US 2004/0183943 A1    Sep. 23, 2004

(30) Foreign Application Priority Data

Jan. 31, 2003    (JP) .............................. 2003-024244

(51) Int. Cl.  
*H05K 7/14* (2006.01)  
*H05K 7/18* (2006.01)

(52) U.S. Cl. ...................... 361/801; 361/752; 361/797; 348/329

(58) Field of Classification Search ........ 361/800–801, 361/752, 797; 348/239  
See application file for complete search history.

(56) References Cited

U.S. PATENT DOCUMENTS

| 5,915,140 A * | 6/1999 | Owashi ...................... 396/448 |
| 6,683,653 B1 * | 1/2004 | Miyake et al. ............... 348/373 |
| 6,781,634 B1 * | 8/2004 | Shiozaki et al. ............. 348/374 |
| 2001/0006401 A1 * | 7/2001 | Nakagawa et al. .......... 348/233 |
| 2001/0017664 A1 * | 8/2001 | Misawa ....................... 348/373 |
| 2001/0048472 A1 * | 12/2001 | Inoue et al. ................. 348/207 |
| 2004/0165108 A1 * | 8/2004 | Okuda ......................... 348/375 |

FOREIGN PATENT DOCUMENTS

| JP | 09-319663 A | 12/1997 |
| JP | 10-042231 A | 2/1998 |

* cited by examiner

*Primary Examiner*—Kamand Cuneo  
*Assistant Examiner*—Hung S. Bui  
(74) *Attorney, Agent, or Firm*—Sughrue Mion, PLLC

(57) ABSTRACT

Open and close of a cover of a recording media holding section is locked and unlocked in accordance with turn-on and turn-off of a power switch. Turn-on and turn-off of the power switch is performed in accordance with an operation of for example a movable grip. When the power switch is turned on, a cover of the recording media is held by the movable grip so as not to be opened.

5 Claims, 5 Drawing Sheets

RECORDING MEDIA PROTECTING MECHANISM

BACKGROUND OF THE INVENTION

1. Field of the Invention

The present invention relates to a recording media protecting mechanism for a digital camera and the like.

2. Description of the Related Art

Recently, various types of electronic equipment, which utilize a detachable memory card incorporating thereinto a solid-state memory as an information storage section, have come onto the market. In this type of electronic equipment, in order to use the memory card, it is necessary that the memory card is mounted on the electronic equipment so that a connector section of the memory card is electrically connected with a connector section of the electronic equipment. In this electrically connected condition, the electric processing between the memory card and the electronic equipment is carried out, so that data transmission therebetween can be performed.

According to the conventional electric equipment, in the event that the memory card, which is mounted on the equipment, is ejected, generally, an eject button is depressed so that the electric connection of the connector of the memory card is released to eject the memory card. However, it may happen that at the time when the electric connection of the connector of the memory card is released, the electric processing for writing of data to the memory card or reading of data from the memory card is now being executed. In the event that such a condition occurs, there is a possibility that important data stored in the memory card will be destroyed.

There is known a memory card ejecting apparatus capable of preventing occurrence of the destruction of data of the memory card, even if an operation of ejecting the memory card is carried out during execution of the electric processing for the memory card. For example, it is a general structure that open and shut of a media cover is detected by a switch, so that a power source is turned off in the open state.

For example, in the event that the mounted memory card is ejected, a slide operation of the eject button causes a change over switch to turn on, so that a processing for stopping data writing of the memory card or data reading of the memory card is executed and the card cover is opened. Subsequently, when a depressing operation is made in a direction perpendicular to the eject button, a gear lever rotatably moves, so that a stoppage of the memory card is released and the connection of the connector is released, and thereby offering a state in which the memory card can be ejected (for example, cf. Japanese Patent Application Laid Open Gazette TokuKai Hei.9-319663 (Pages 2–4, FIG. 2)).

Further, in order to implement safe writing and reading of data to the recording medium inserted into a digital camera, there is known a technology of ensuring safety of the recording medium in such a manner that at an insertion slot for inserting a recording medium into a digital camera, there are provided a cover for inhibiting ejection and insertion of the recording medium in the closed state and a switch for detecting open and close states of the cover, and a control apparatus for performing communication with the digital camera so that it does not request a reading operation and a writing operation for the recording medium until the cover is closed, when it is detected that the cover is opened (for example, cf. Japanese Patent Application Laid Open Gazette TokuKai Hei.10-42231 (Pages 2–6, FIG. 1)).

According to the above-mentioned related art, the prevention of ejection and insertion of the media while the media is energized is implemented by means of providing a detection mechanism of an open and close state of a media cover. However, this technology involves problems such as a power failure due to chattering by external impact (vibration) and cost increases due to addition of the detection mechanism. Further, in the event that the detection mechanism brings about a malfunction, it would be difficult to prevent data from being destroyed, and thus there is a problem as to poor reliability.

SUMMARY OF THE INVENTION

In view of the foregoing, it is an object of the present invention to provide a recording media protecting mechanism capable of safely performing writing and reading data to recording medium inserted into a digital camera.

To achieve the above-mentioned objects, the present invention provides a recording media protecting mechanism in which a turn-on and turn-off operating section for a power switch is disposed at a position of locking and unlocking open and close of a cover of a recording media holding section in accordance with turn-on and turn-off of the power switch.

According to the present invention, it is permitted to eject recording media only when the power switch is turned off. In other words, it is inhibited that the recording media is ejected when the power switch is turned on. Therefore, it is possible to prevent the occurrence of damage to the recording media.

DETAILED DESCRIPTION OF PREFERRED EMBODIMENTS

Embodiments of the present invention will be described with reference to the accompanying drawings.

Figure 1:
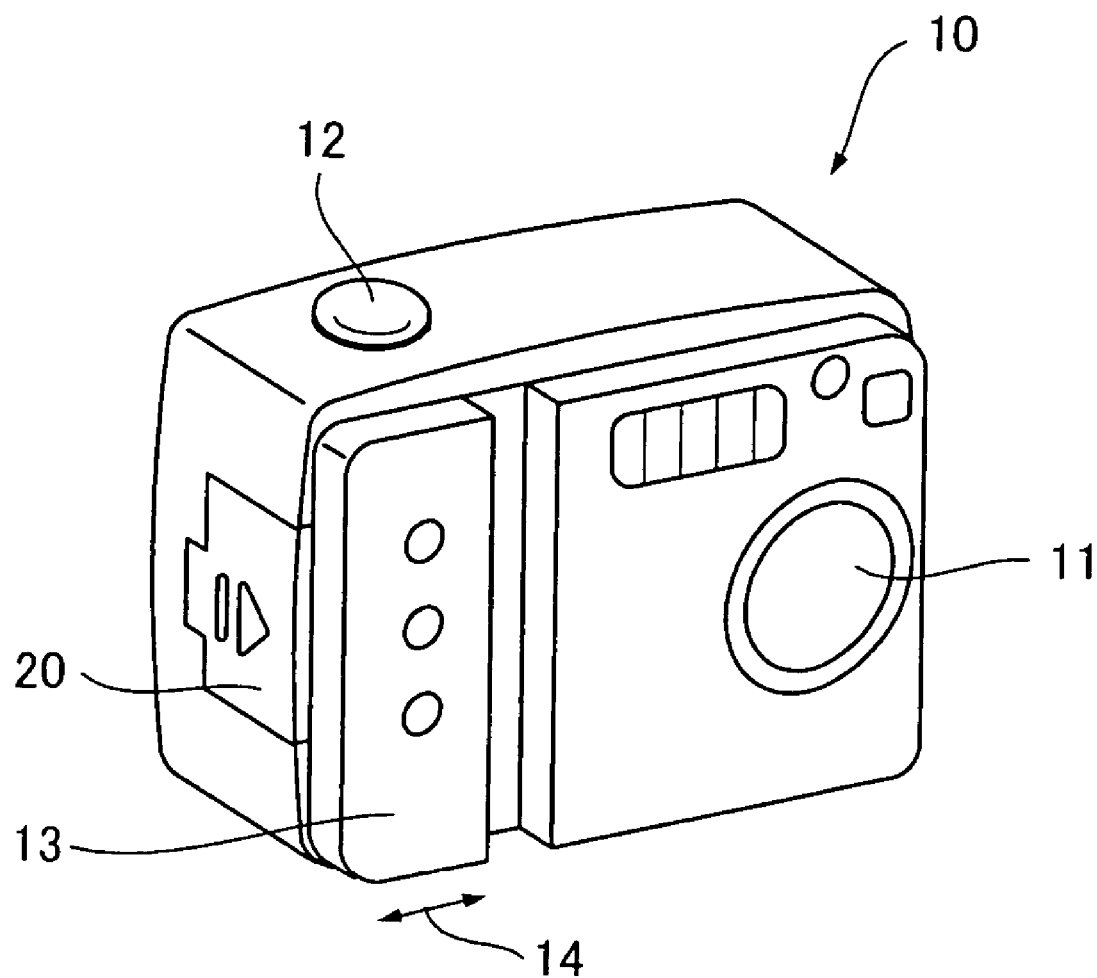
FIG. 1 is a perspective view of a camera according to an embodiment of the present invention.
Figure 2:
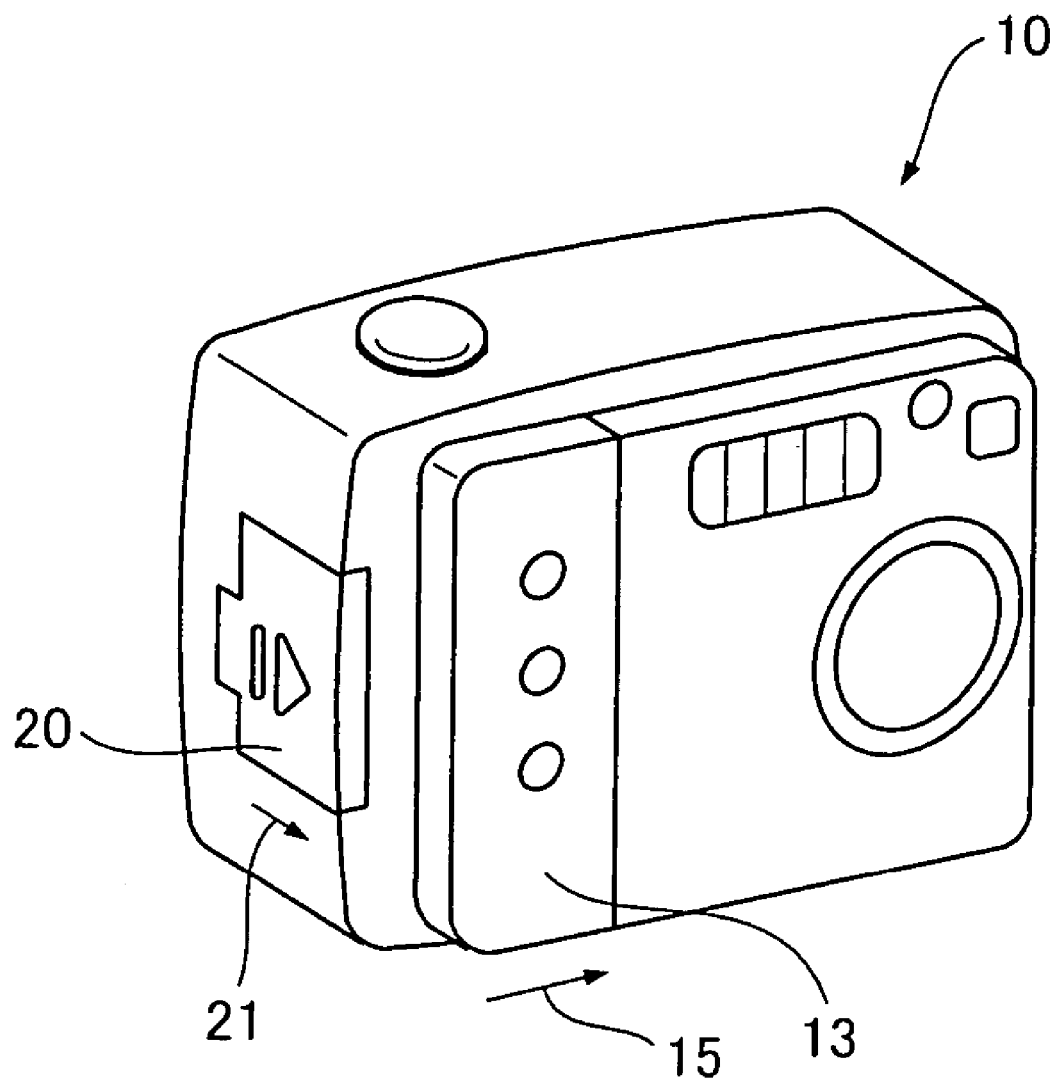
FIG. 2 is a perspective view of a camera according to an embodiment of the present invention.
Figure 3:
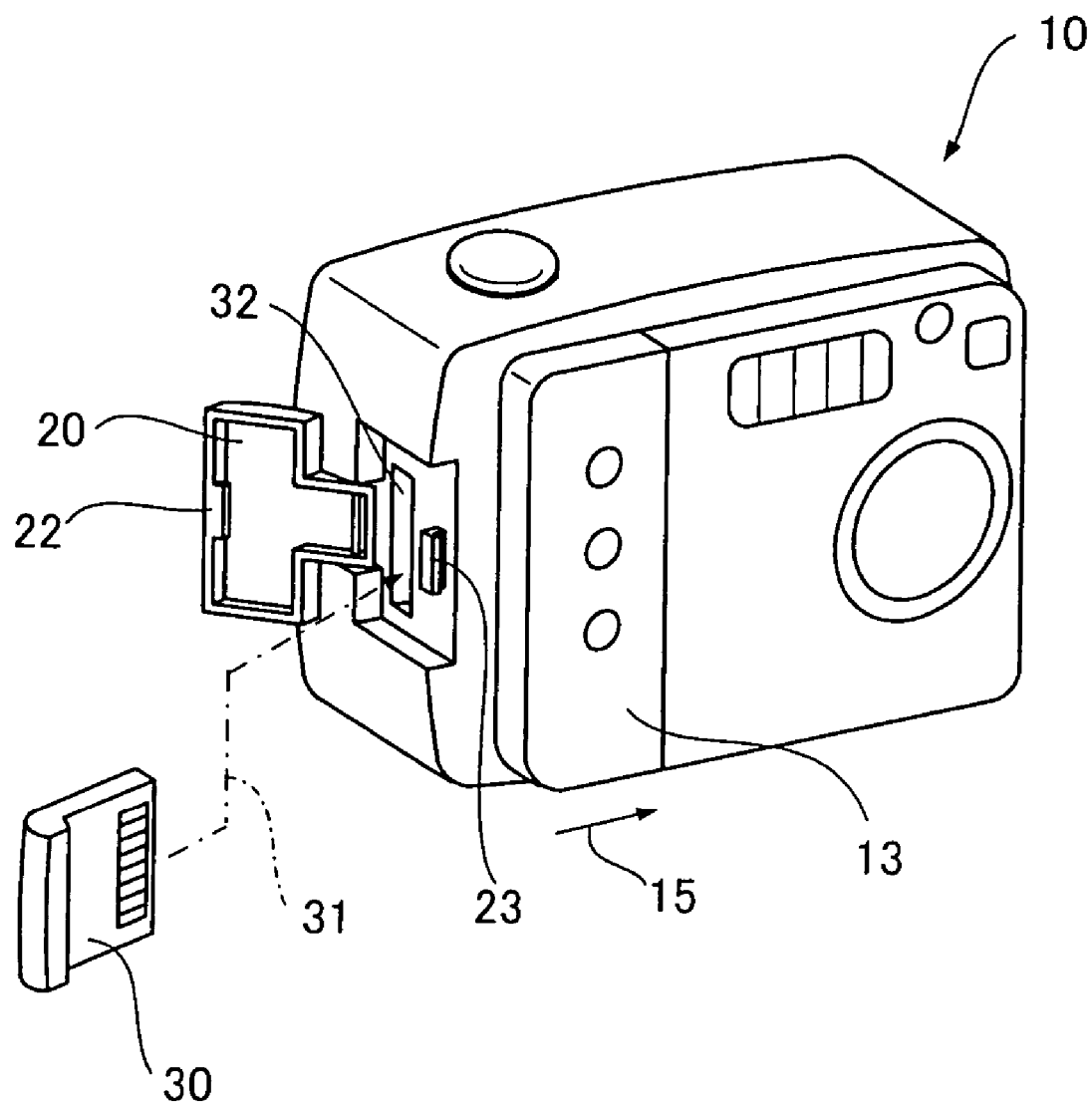
FIG. 3 is a perspective view of a camera according to an embodiment of the present invention.

FIGS. 1 to FIG. 3 are a perspective view of a camera according to an embodiment of the present invention.

A camera 10 comprises a lens 11, a release button 12, and a movable grip 13. The movable grip 13 is a hand holding part of a camera which is movable to adapt for holding the camera with hand when the camera is on duty for photographing, and to adapt for fitting the camera in a carrying case. The movable grip 13 is movable in directions as shown by an arrow 14. When the movable grip 13 is in a state as shown in FIG. 1, the movable grip 13 serves to turn on a power switch (not illustrated), so that a cover 20 of a recording media storage section is held so as not to be opened.

FIG. 2 shows a state that the movable grip 13 moves in a direction as shown by an arrow 15, so that the camera offers an unused state. At that time, the power switch (not illustrated) is turned off, and the cover 20 of the recording media storage section is movable in a direction as shown by an arrow 21.

FIG. 3 shows a state that the cover 20 is opened, and a recording media 30 is detachably mounted on a recording media insertion section 32 as shown by an arrow 31.

Figure 4:
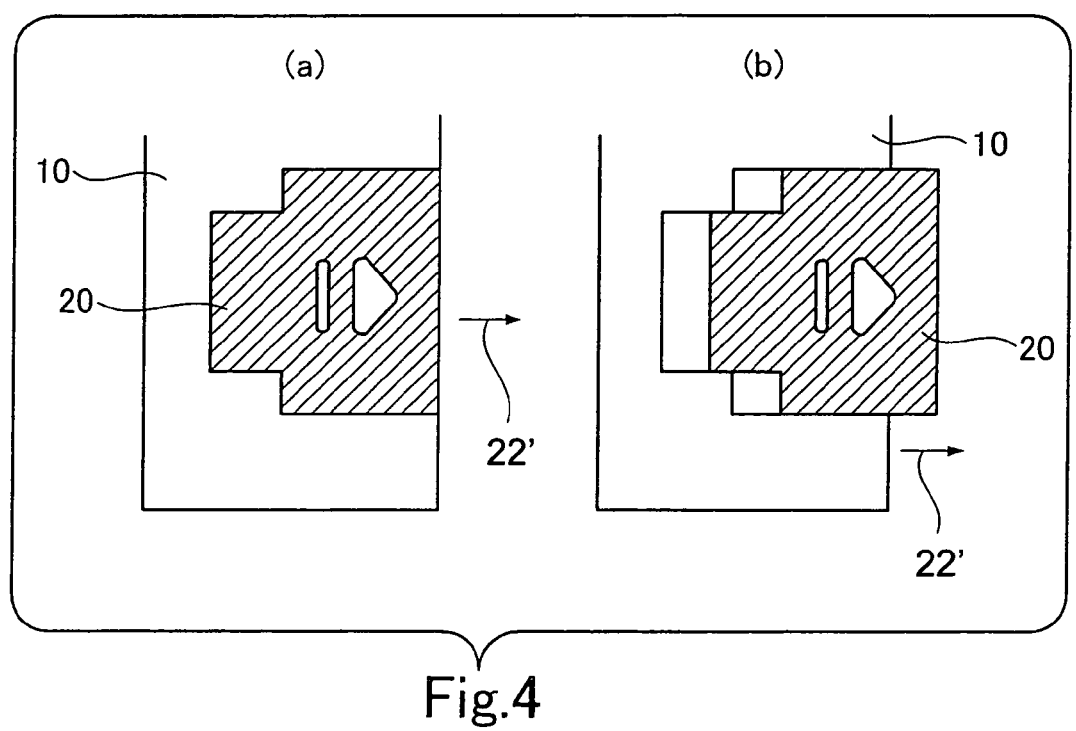
FIG. 4 is an explanatory view useful for understanding open and close of a cover of a media holding section.

FIG. 4 is an explanatory view useful for understanding the opening and closing of the cover 20 of a media holding section. FIG. 4 shows an outer surface of the cover 20. As shown in part (a) of FIG. 4, the cover 20 is drawn out in a direction as shown by an arrow 22' from a state that the cover 20 is mounted on the camera 10. And when it is in a state as shown in part (b) of FIG. 4, as shown in FIG. 3, a lock section 23 fixing the cover 20 is disengaged from an engagement section 22, so that the cover 20 is rotatably movable. When the cover 20 is opened as shown in FIG. 3, the insertion section 32 of the recording media 30 opens.

When the movable grip 13 moves to a photographic position, the power turns on, and the cover 20 of the insertion section 32 of the recording media 30 is inhibited from being opened. When the movable grip 13 moves to the unused position as shown in FIG. 3, the power always turns off, so that the recording media 30 is protected from being damaged even if the recording media 30 is inserted and ejected.

Figure 5:
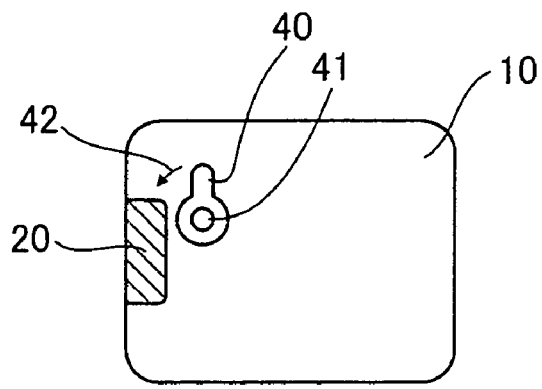
FIG. 5 is a typical explanatory view of another embodiment.
Figure 6:
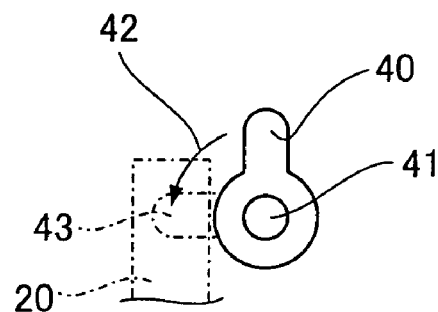
FIG. 6 is an operational explanatory view of the embodiment shown in FIG. 5.

FIG. 5 is a typical explanatory view of another embodiment. According to the present embodiment, a swinging switch 40 swinging on a shaft 41, rather than the movable grip 13 as shown in FIGS. 1 to 3, is adopted as a power switch, and the power switch turns on when the swinging switch 40 swings in a direction as shown by an arrow 42, and the cover 20 of the recording media is locked as shown in FIG. 6.

Figure 7:
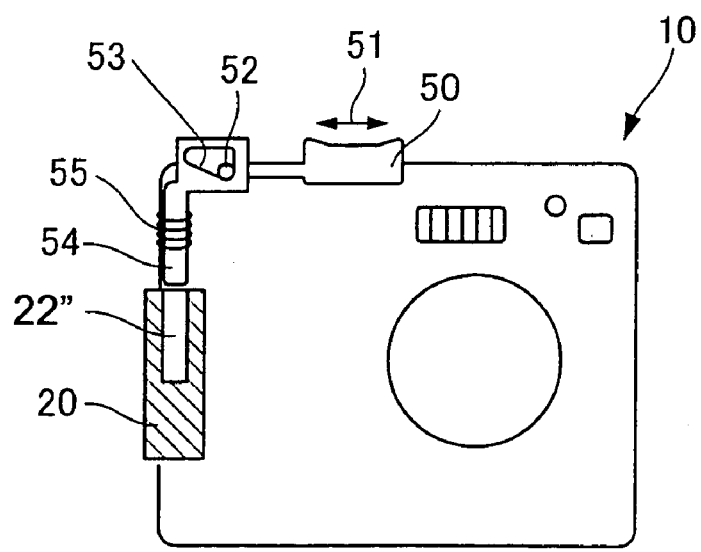
FIG. 7 is a typical explanatory view of still another embodiment.

FIG. 7 is a typical explanatory view of still another embodiment in which a power switch 50 is slideable in a direction as shown by an arrow 51, so that a pin 54 is inserted into a hole 22" of the cover 20 via a pin 52 and a lift cam 53.

Also in the embodiments of FIGS. 5 and 7, the cover 20 of the recording media storage section is inhibited from being opened when the power switch turns on. Thus, there is no occurrence of troubles due to insertion and ejection of the recording media at the state of turn-on of the power switch.

According to the present invention, open and close of the cover are structurally inhibited in a state that the power switch turns on, and thus it is possible to surely achieve the object of the present invention without occurrence of a cost increase by increment of parts.

As mentioned above, according to the present invention, it is possible to provide a recording media protecting mechanism in a digital camera in which a power switch is movable, without occurrence of the cost increase by increment of parts, in such a manner that the cover of the recording media storage section is structurally inhibited from being opened at the time of turn-on of the power switch.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A recording media protecting mechanism in which a turn-on and turn-off operating section for a power switch is disposed at a position of locking and unlocking open and close of a cover of a recording media holding section in accordance with turn-on and turn-off of the power switch, such that when the turn-on and turn-off operating section turns on the power switch the turn-on and turn-off operating section also physically locks the cover to prevent opening thereof, and when the turn-on and turn-off operating section turns off the power switch the turn-on and turn-off operating section also unlocks the cover to permit opening thereof.

2. A recording media protecting mechanism claimed in claim 1, wherein the mechanism is for a digital camera and the cover of the recording media holding section is locked during the camera on duty.

3. A recording media protecting mechanism claimed in claim 2, wherein the turn-on and turn-off operating section is a movable grip which serves to turn on the power switch and keeps the cover of the recording media storage section being held so as not to be opened.

4. A recording media protecting mechanism claimed in claim 1, wherein the mm-on and mm-off operating section is a swinging switch which locks the cover of the recording media holding section when the switch swings in a turning-on direction.

5. A recording media protecting mechanism claimed in claim 1, wherein the turn-on and turn -off operating section is a sliding switch which locks the cover of the recording media holding section via an inserting pin into a hole and a lift cam.

* * * * *